United States Patent [19]

Pilkington

[11] Patent Number: 5,230,594
[45] Date of Patent: Jul. 27, 1993

[54] MACHINE TOOL FOR PROCESSING PLATELIKE WORKPIECES

[75] Inventor: Donald J. Pilkington, Kettering Northants, England

[73] Assignee: GFM Gesellschaft für Fertigungstechnik und Maschinenbau Aktiengesellschaft, Steyr, Austria

[21] Appl. No.: 868,629

[22] Filed: Apr. 14, 1992

[30] Foreign Application Priority Data

Apr. 18, 1991 [EP] European Pat. Off. ............ 91890081

[51] Int. Cl.⁵ .................................................. B23C 9/00
[52] U.S. Cl. ..................................... 409/197; 408/95; 409/235
[58] Field of Search ................... 408/95, 98; 409/189, 409/197, 190.1, 191, 225, 235

[56] References Cited

U.S. PATENT DOCUMENTS

| | | |
|---|---|---|
| 3,587,391 | 6/1971 | Pitts et al. |
| 4,158,987 | 6/1979 | Smith ................... 409/190 |
| 4,251,174 | 2/1981 | Satler ................... 409/191 |
| 4,382,728 | 5/1983 | Anderson et al. ........ 409/235 |
| 4,514,122 | 4/1985 | Campbell ............... 409/190 |

FOREIGN PATENT DOCUMENTS

| | | |
|---|---|---|
| 0010043 | 4/1980 | European Pat. Off. |
| 40213 | 3/1983 | Japan ................... 409/197 |

*Primary Examiner*—Daniel W. Howell
*Attorney, Agent, or Firm*—Collard & Roe

[57] ABSTRACT

A machine tool for processing platelike workpieces, particularly for machining the contours of superimposed sheet metal elements, comprises a work-supporting deck having a supporting surface and workpiece-fixing means, and a tool unit, which is mounted on a tool carriage and is movable over the supporting surface, wherein a holding-down device is provided, which is movable over the supporting surface in unison with the tool unit and comprises a holding-down shoe, which is adapted to be forced against the top surface of the workpiece to hold the workpiece in position close to the location at which the workpiece is being processed. For an improved holding of the workpieces in position particularly during a progressive cutting of blanks out of the workpieces and during a machining of the workpieces at their contour, the holding-down device is mounted on a separate holding-down carriage, which is operable to move the holding-down device in unison with the tool unit mounted on the tool carriage and which during the processing is adapted to be displaced relative to the tool carriage in that the movement in unison is interrupted and the holding-down device is thus held in a fixed position relative to the workpiece when this is required.

9 Claims, 2 Drawing Sheets

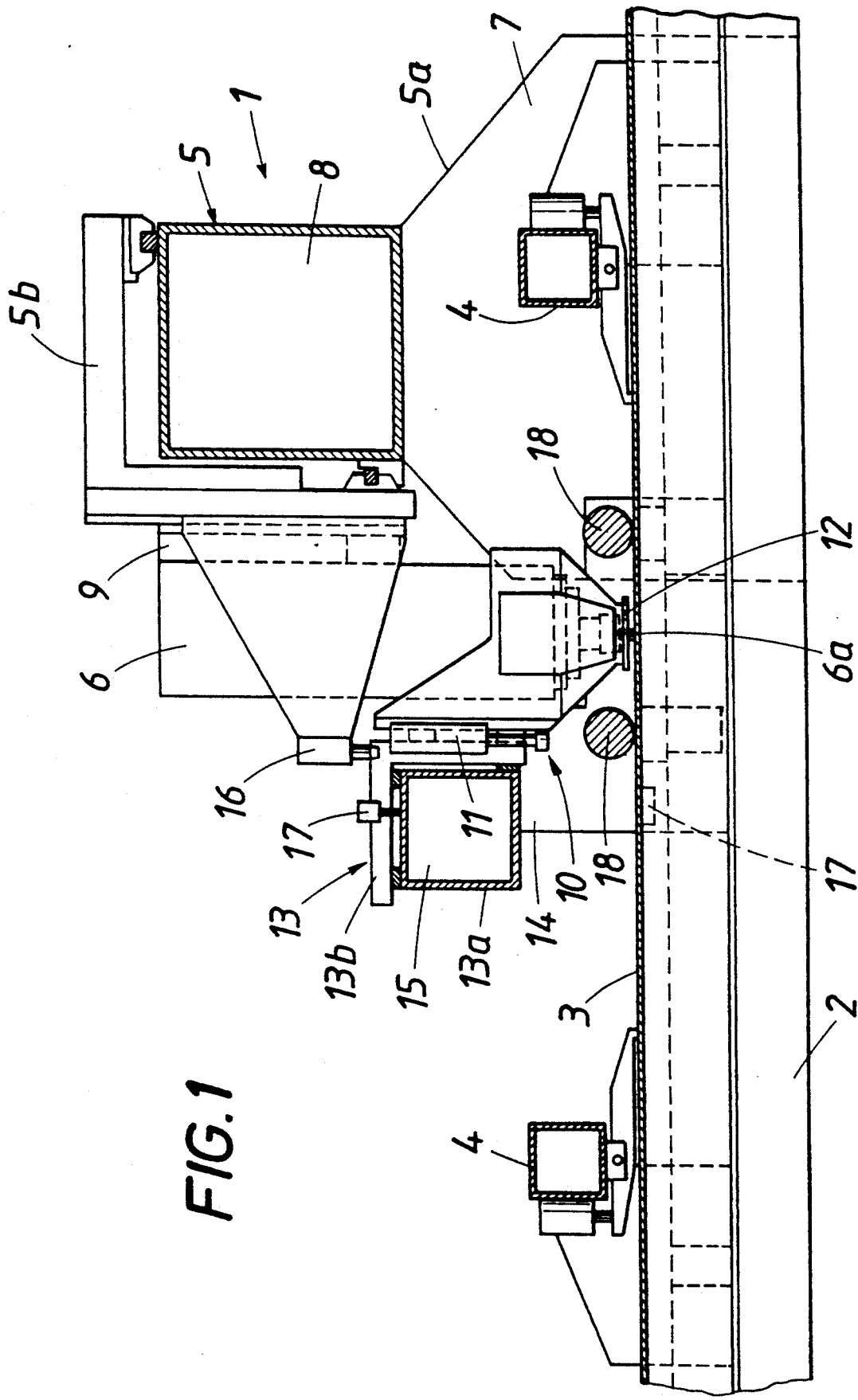

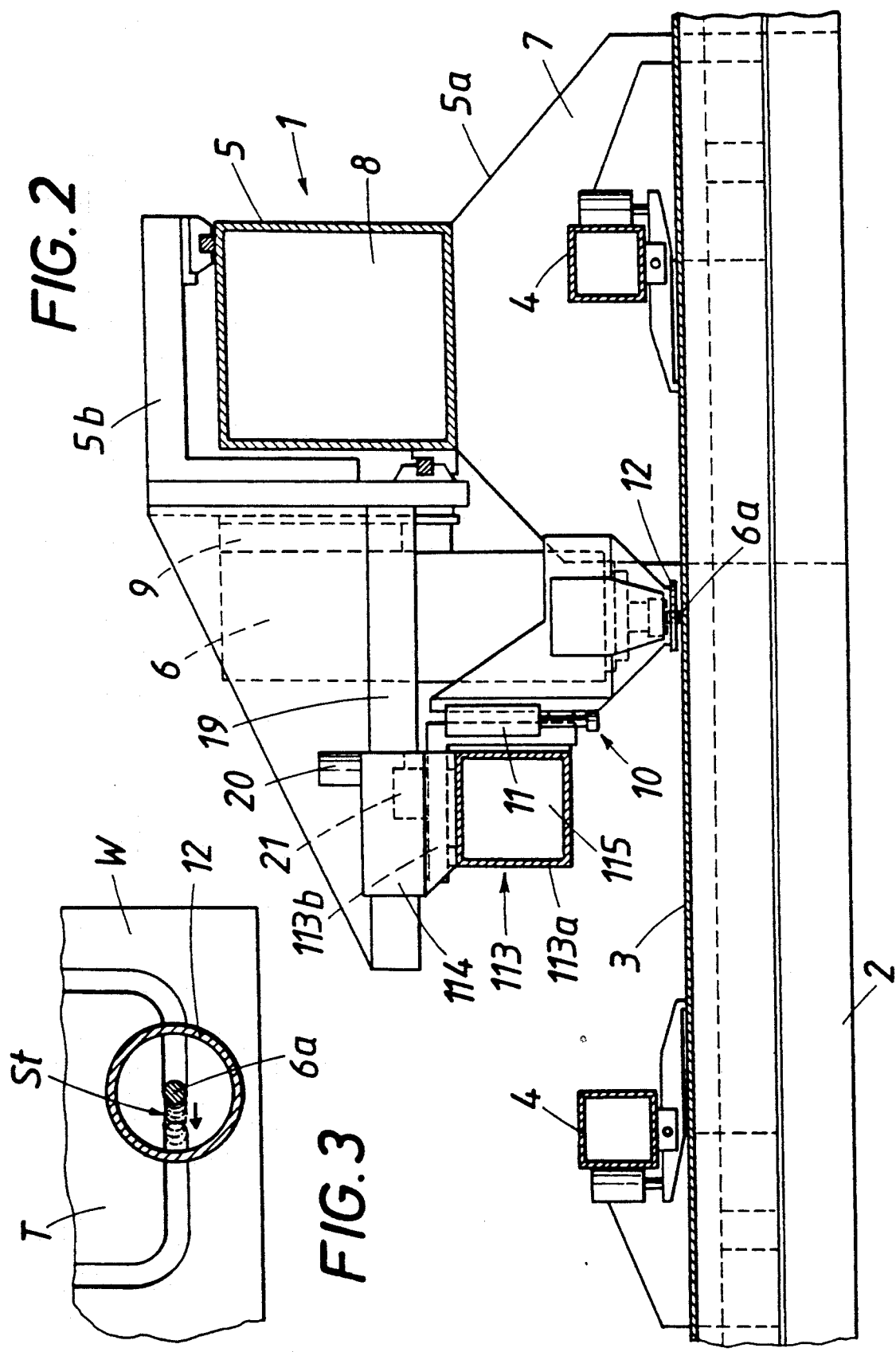

MACHINE TOOL FOR PROCESSING PLATELIKE WORKPIECES

BACKGROUND OF THE INVENTION

1. Field of the Invention

This invention relates to a machine tool for processing platelike workpieces, particularly for machining the contours of superimposed sheet metal elements, which machine tool comprises a work-supporting deck having a supporting surface and workpiece-fixing means, and a tool unit, which is mounted on a tool carriage and is movable over the supporting surface, wherein a holding-down device is provided, which is movable over the supporting surface in unison with the tool unit and comprises a holding-down shoe, which is adapted to be forced against the top surface of the workpiece to hold the workpiece in position close to the location at which the workpiece is being processed.

2. Description of the Prior Art

A workpiece cannot neatly be processed by such a machine tool unless the workpiece is reliably held in position, and in many cases it is particularly necessary to hold the workpiece firmly in position close to the location at which the workpiece is being processed. Particularly for a joint processing of superimposed workpieces, e.g., for a progressive cutting of blanks out of or for contour milling of sheet metal elements, it is necessary to properly hold the workpiece stack in position relative to the supporting surface and against a movement of the several sheets relative to each other. In the previous practice this has been accomplished in that stacks of workpieces were reveted to a bottom fixing pallet to form a work unit, which was then fixed to the work-supporting deck by existing fixing means, which may comprise holding-down claws or suction boxes for applying a vacuum to the supporting surface. In order to hold the workpiece in position also close to the location at which the workpiece is being processed, an additional holding-down device has been provided, which comprises an annular holding-down shoe, which may concentrically surround the tool spindle. During the processing of the workpieces that holding-down shoe is forced down against the stack of workpieces or the workpiece and is moved in unison with the tool so that the workpiece is held in position as desired near the location at which the workpiece is being processed. As is apparent from U.S. Pat. No. 3,587,391 or EP-A 0 010 043 the known holding-down devices are mounted directly on the tool unit so that they are compelled to follow the feed movement of the tool. As a result, it is difficult during a cyclic processing, e.g., during a progressive cutting of blanks out of sheet metal elements, to cut through the final land at the end of the processing because the severing of said land will separate the blank from the remainder of the workpiece and the feed movement of the tool and of the holding-down shoe may then result in a displacement of the parts which have been cut off so that the cut may not be as precise as is required. For this reason the parts to be cut out and the remaining parts must be riveted in spite of the provision of the holding-down means so that the known retaining means are expensive and require time-consuming operations as well as an inevitable perforation of the workpieces.

SUMMARY OF THE INVENTION

For this reason it is an object of the invention to eliminate said disadvantages and to provide a machine tool which is of the kind described first hereinbefore and which is of the kind described first hereinbefore and which ensures a satisfactory processing of one or more workpieces particularly by a progressive cutting of blanks out of or by a contour milling of sheet metal elements and which permits a processing of stacks of workpieces which are not riveted.

That object is accomplished in accordance with the invention in that the holding-down device is mounted on a separate holding-down carriage, which is operable to move the holding-down device in unison with the tool unit mounted on the tool carriage and which during the processing is adapted to be displaced relative to the tool carriage in that the movement in unison is interrupted and the holding-down device is thus held in a fixed position relative to the workpiece when this is required. Because the holding-down device is carried by a separate holding-down, carriage, the holding down device is not compelled always to move in unison with the tool unit so that the holding-down device can be held in a fixed position when this is required. As a result, it is possible for a progressive cutting of blanks out of workpieces to move the holding-down shoe in unison with the tool unit along the desired line of cut and to hold the holding down-device in position when the final land is to be cut through in the final phase of the processing. It is now possible to force down the holding-down shoe against the workpiece in a fixed position relative to the workpiece while the tool is advanced alone to complete the processing cycle so that the holding-down shoe will then ensure an exact fixation of the blanks which have been cut out and of the remaining parts of the workpiece. The cut can thus proceed along the desired line and the processing will be performed satisfactorily, whether by contour milling or by another cutting method, and it will not be necessary to rivet the workpieces together.

The holding-down carriage may consist of any carriage which can be moved in unison with the tool carriage. Because the tool carriage consists in most cases of a compound carriage comprising a saddle extending across and movable along the supporting surface and a cross-slide movable along the saddle so that the tool unit can be moved over the supporting surface in any desired direction to positions defined by X- and Y-coordinates, it will be desirable to provide a holding-down carriage which also consists of a compound carriage so that the carriages can be moved in unison in a simple manner. The holding-down carriage is desirably guided on the work-supporting deck in a direction which is parallel to the direction in which the tool carriage is guided on that deck and that part of the holding-down carriage which carries the holding-down device is adapted to be coupled to that part of the tool carriage which carries the tool unit by coupling means so that special drive means for the holding-down carriage are not required and the holding-down carriage can be moved by the tool carriage. When the tool carriage and the holding-down carriage are thus coupled to each other the tool unit and the holding-down device will be moved in unison for a conventional processing. On the other hand, when the coupling means are disengaged, the holding-down device will be held in position and the tool carriage will continue to move the tool unit so that the tool unit will move relative to the holding-down device. It will be understood that the use of an annular holding-down shoe will require the extent of said relative displacement to be adapted to the diametral clearance.

If means are provided for clamping the holding-down carriage in position, it will be possible to exactly hold the holding-down carriage and the holding-down shoe in the desired position when the coupling means have been disengaged.

According to a desirable feature of the invention that part of the holding-down carriage which is movable in the longitudinal direction of the deck is provided with rotatably mounted pressure-applying rollers, which are disposed before and behind the holding-down shoe in said longitudinal direction and extend across the supporting surface and are engageable with the top surface of the workpiece. In that case the holding-down carriage is provided in addition to the holding-down shoe with other means for holding the workpieces in position. Such pressure-applying rollers move in unison with the holding-down device along the deck and retain the workpieces at different locations spaced over the width of the workpiece so that even relatively large workpiece stacks can be processed satisfactorily.

In accordance with the invention the holding-down carriage can be mounted on the tool carriage and may preferably be provided with drive means for selectively imparting to that part of the holding-down carriage which carries the holding-down device a movement which is equal and opposite to the movement performed relative to the work-supporting deck by that part of the tool carriage which carries the tool unit. That feature will result in a fairly compact structure. In that case the holding-down carriage will be fixed to the tool carriage during the normal processing of the workpiece so that the tool carriage will cause the holding-down device to move in unison with the tool unit. For a displacement of the holding-down device relative to the tool unit it will then be necessary to impart to that part of the holding-down carriage which carries the holding-down device a movement which is equal and opposite to the movement performed relative to the work-supporting deck by that part of the tool carriage which carries the tool unit so that the holding-down device will then be held in a fixed position relative to the work-supporting deck and the workpieces. In that case too it will be desirable to provide a holding-down carriage which is similar in design to the tool carriage so that the movements of the parts of each of the two carriages can be coordinated and controlled in a simple manner. Because the extent of the relative displacement will be relatively small, the holding-down carriage may be relatively small too and may be mounted on the tool carriage within a small space.

BRIEF DESCRIPTION OF THE DRAWING

FIG. 1 is a fragmentary longitudinal sectional view showing a part of a machine tool embodying the invention.

FIG. 2 is also a fragmentary longitudinal sectional view showing a part of a different machine tool embodying the invention.

FIG. 3 is a top plan view illustrating a processing operation which can be performed by a machine tool as shown in FIG. 1 or 2.

DETAILED DESCRIPTION OF THE PREFERRED EMBODIMENTS

The invention will now be explained more in detail with reference to the schematic drawing, in all figures of which like reference characters designate like parts.

With reference to FIG. 1 a machine tool 1 for a contour milling of platelike workpieces, particularly of superimposed sheet metal elements, comprises a work-supporting deck 2, which is not shown in detail and has a supporting surface 3 for supporting the workpieces and is provided with workpiece-fixing means consisting of holding-down claws 4, which are adjustable along the deck. A tool carriage 5 is provided, which carries a tool unit 6, such as a spindle unit comprising a contour milling cutter 6a. For moving the tool unit 6 over the supporting surface 3 in any desired direction the tool carriage comprises a saddle 5a, which is guided to be movable along the deck, and a cross-slide 5b, which is movable along the saddle. The saddle 5a is guided to move along the work-supporting deck 2 by lateral guide cheeks 7 and is movable along said deck by drive means, not shown. The cross-slide 5b is carried by a cross-beam 8, which extends across the supporting surface 3 of the work-supporting deck 2 and constitutes a track for the cross-slide 5b. By drive means, not shown, the cross-slide 5b is movable along the cross-beam 8. The drive means for the saddle 5a and for the cross-slide 5b may consist, e.g., of rack-and-pinion drives or screw drives of known design. The tool unit 6 is mounted on the cross-slide 5b by means of a vertical slide 9 for adjusting the milling cutter 6a to the desired elevation.

For holding a workpiece in position close to the location at which the workpiece is being processed, i.e., adjacent to the milling cutter 6a, a holding-down device 10 is provided, which comprises a holding-down shoe 12 and a fluid-operable cylinder 11 for raising and lowering that shoe 12, which is annular and coaxially surrounds the milling cutter 6a so that the holding-down shoe 12 can be forced down to hold the workpieces in position in a region which concentrically surrounds the location at which the workpieces are being milled. The holding-down device 10 is mounted on a holding-down carriage 13, which like the tool carriage 5 comprises a saddle 13a and a cross-slide 13b. The saddle 13a is guided by lateral guiding cheeks 14 along the work-supporting deck 2 and the cross-slide 13b is slidably mounted on a cross-beam 15, which extends across the supporting surface 3.

During the usual processing it is desired to move the holding-down shoe 12 and the contour milling cutter 6a in unison. This is ensured by coupling means 16 for coupling the cross slide 5b of the tool carriage 5 and the cross-slide 13b of the holding-down carriage 13 to each other so that the cross-slide 13b having no drive means of its own will be compelled to move exactly in unison with the cross-slide 5b and the tool and the holding-down device will thus be moved in unison when this is desired. When that movement in unison is to be discontinued and a movement of the tool and the holding-down device relative to each other is desired, the two cross-slides 5b and 13b are simply uncoupled from each other and clamping means 17 can then be actuated to fix the holding-down carriage 13 and the holding-down device 12 in the desired position while the tool carriage 5 continues to move the tool unit 6.

The workpiece can be even more firmly held in position by means of pressure-applying rollers 18, which are rotatably mounted on the saddle 13a of the holding-down carriage 13 in front of and behind the holding-down shoe 12 and extend across the supporting surface 3. Said rollers 18 are moved along the deck 2 in unison with the holding-down device 10 and in the processing of platelike workpieces, such as sheet metal elements, do not only hold the workpieces in position but may also compensate uneven portions of or waves in the workpiece.

In the embodiment shown in FIG. 2 the holding-down device 10 is mounted on a holding-down carriage 113, which also comprises a saddle 113a and a cross-slide 113b and is not directly mounted on the work-supporting deck 2 but is mounted on the tool carriage 5, the cross-slide 5b of which is provided with track means 19 extending along the deck 2. The saddle 113a of the holding-down carriage is slidably mounted on the track means 19 and has side cheeks 114, which are guided by said track means 19 over a relatively short distance. The holding-down carriage 113 comprises a cross-beam 115, on which the cross-slide 113b is mounted to be slidable over a small distance. Said freedoms of movement will be sufficient to permit the desired displacement of the milling cutter 6a and the holding-down shoe 12 relative to each other. During the normal processing, the holding-down carriage 113 is fixed to the tool carriage 5 so that the holding-down device 10 will be compelled to move in unison with the tool unit 6. Only when a displacement of the tool unit 6 and holding-down device 10 relative to each other is desired is the cross-slide 113b of the holding-down carriage 113 operated to perform relative to the cross-slide 5b of the tool carriage 5 a movement which is equal and opposite to the movement which is performed by the cross-slide 5b relative to the work-supporting deck 2. As a result, the holding-down device 10 is then held in position relative to the work-supporting deck 2 and only the tool unit 6 follows the feed movement performed by the cross-slide 5b. The desired movement relative to the tool carriage 5 is imparted to the cross-slide 113b of the holding-down carriage 113 by drive means 20 and 21 coupled to the saddle 113a and to the cross-slide 113b, respectively.

As is indicated in FIG. 3 the machine tool 1 in accordance with the invention can be used for a satisfactory progressive cutting of blanks T out of a stack of workpieces W and for a machining of the contours of such blanks T because during the progressive cutting operation along an annular line of cut the holding-down shoe 12 is moved in unison with the milling cutter 6a and thus holds the stack of workpieces W in position at the location at which it is being processed. But because the holding-down shoe 12 and the contour milling cutter 6a can be moved relative to each other, the final land St left shortly before the end of the processing operation can be severed satisfactorily because during that final phase of the processing the holding-down shoe 12 is held in position relative to the workpiece and only the contour milling cutter 6a continues to move relative to the work-supporting deck 2 and the workpiece W until the land St has been severed. This is illustrated in FIG. 3.

Because the holding-down shoe 12 holds in position the workpieces W as well as the cut-out blanks T, the blanks T cannot yield to the cutting forces during the severing of the land St so that a cut exactly along the desired line is ensured.

I claim:

1. In a machine tool for processing platelike workpieces, comprising
    a work-supporting deck having a supporting surface and provided with fixing means for fixing at least one workpiece to said deck on said supporting surface,
    a tool carriage, mounted to be movable relative to said deck and comprises a first carrier,
    a tool unit, which is mounted on said first carrier and is movable by said first carrier over said supporting surface and comprises tool means for processing said workpiece, and
    a holding-down device, which is mounted movable relative to said deck over said supporting surface in unison with said tool unit and comprises a holding-down shoe and means for forcing down said holding-down shoe against said workpiece adjacent to said tool means to hold said workpiece in position on said supporting surface adjacent to said tool means,
    the improvement comprising
    a holding-down carriage is mounted to be movable relative to said deck and comprising a second carrier, movable over said supporting surface relative to said deck and to said first carrier,
    said holding-down device being mounted on said second carrier, and
    means for selectively moving said second carrier in unison with said first carrier relative to said deck and for selectively holding said second carrier in position relative to said deck during a movement of said first carrier relative to said deck.

2. The improvement set forth in claim 1, comprising coupling means are provided which are selectively engageable to couple said first and second carriers to each other.

3. The improvement set forth in claim 2, comprising clamping means for selectively holding said holding-down carriage in position on said deck when said coupling means are disengaged.

4. The improvement set forth in claim 2, wherein
    said work-supporting deck has a longitudinal direction,
    said holding-down carriage comprises a saddle, which is mounted to be movable relative to said deck in said longitudinal direction, and
    said holding-down carriage comprises clamping rollers, which extend over the width of said supporting surface and are spaced from said holding-down shoe in said longitudinal direction on opposite sides of said holding-down shoe and are adapted to be selectively forced down on said workpiece.

5. The improvement set forth in claim 2, wherein
    said deck and said tool carriage comprise guiding means cooperating to guide said tool carriage in a predetermined direction relative to said deck, and
    said deck and said holding-down carriage comprise guiding means cooperating to guide said holding-down carriage in said predetermined direction relative to said deck.

6. The improvement set forth in claim 1, wherein said deck and said tool carriage comprise guiding means cooperating to guide said tool carriage in a predetermined direction relative to said deck.

7. The improvement set forth in claim 1, wherein said holding-down carriage is movably mounted on and adapted to be held in position on said tool carriage by drive means.

8. The improvement set forth in claim 7, wherein
said deck and tool carriage comprise guiding means cooperating to guide said tool carriage in a predetermined direction relative to said deck, and
said tool carriage and said holding-down carriage comprise guiding means cooperating to guide said holding-down carriage in said predetermined direction relative to said tool carriage.

9. The improvement set forth in claim 7, wherein
the drive means are operatively connected to said second carrier and selectively operable to impart to said second carrier relative to said first carrier a movement which is equal and opposite to the movement of said first carrier relative to said work-supporting deck.

* * * * *